US008790932B2

(12) United States Patent
Augstein et al.

(10) Patent No.: US 8,790,932 B2
(45) Date of Patent: Jul. 29, 2014

(54) METHOD FOR PROVIDING A DRIED REAGENT IN A MICROFLUIDIC SYSTEM AND MICROFLUIDIC SYSTEM

(75) Inventors: Manfred Augstein, Mannheim (DE); Romi Roedl, Mutterstadt (DE); Susanne Wuerl, Mannheim (DE); Valerie Winckler-Desprez, Ladenburg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 352 days.

(21) Appl. No.: 12/573,472

(22) Filed: Oct. 5, 2009

(65) Prior Publication Data

US 2010/0112717 A1 May 6, 2010

(30) Foreign Application Priority Data

Nov. 6, 2008 (EP) .................................... 08019462

(51) Int. Cl.
*G01N 1/42* (2006.01)
*B05D 1/26* (2006.01)
*B01J 19/00* (2006.01)

(52) U.S. Cl.
USPC ............................ 436/180; 436/176; 436/174

(58) Field of Classification Search
None
See application file for complete search history.

(56) References Cited

U.S. PATENT DOCUMENTS 5,102,788 A * 4/1992 Cole ............................. 435/7.9
2004/0209353 A1 10/2004 Chien et al.
2007/0054270 A1 3/2007 Inganas et al.
2007/0259348 A1 * 11/2007 Phadke et al. .................... 435/6
2007/0280857 A1 12/2007 Song et al.
2009/0191643 A1 7/2009 Boehm et al.

FOREIGN PATENT DOCUMENTS

WO 9304195 A1 3/1993
WO 03035909 A2 5/2003
WO 2008037469 A1 4/2008

OTHER PUBLICATIONS

Sloman, A. W. et al. "A microcontroller-based driver to stabilize the temperature of an optical stage to within 1 mK in the range 4-38 degrees C, using a Peltier heat pump and a thermistor sensor." Mesaurement Science and Technology (1996) 7 1653-1664.*
Hoegger, Daniela, et al. "Disposable microfluidic ELISA for the rapid determination of folic acid content in food products." Anal Bioanal Chem (2007) 387 267-275.*
Garcia, E., Kirkham, J.R., Hatch, A.V., Hawkins, K.R., Yager, P., "Controlled microfluidic reconstitution of functional protein from an anhydrous storage depot", Lab Chip, 2004, 4, p. 78-82.
Prescott, J.H., Krieger, T.J., Lipka, S., Staples, M.A., "Dosage Form Development, in Vitro Release Kinetics, and in Vitro-in Vivo Correlation for Leuprolide Released from an Implantable Multi-reservoir Array", Pharmaceutical Research, vol. 24. No. 7, Jul. 2007, p. 1252-1261.
Seetharam, R., Wada, Y., Ramachandran, S., Hess, H., Satir, P., "Long-term storage of bionanodevices by freezing and lyophilization", Lab Chip, 2006, 6, p. 1239-1242.

* cited by examiner

*Primary Examiner* — Christopher A Hixson
(74) *Attorney, Agent, or Firm* — Dinsmore & Shohl LLP

(57) ABSTRACT

A method for providing a dried reagent in a microfluidic system is provided, the method comprising the following steps: providing a microfluidic system having a microfluidic structure, introducing a flowable carrier medium containing a reagent in the microfluidic structure, and drying the reagent in the microfluidic structure by lyophilization.

11 Claims, No Drawings

METHOD FOR PROVIDING A DRIED REAGENT IN A MICROFLUIDIC SYSTEM AND MICROFLUIDIC SYSTEM

BACKGROUND OF THE INVENTION

The invention relates to a method for providing a dried reagent in a microfluidic system as well as to a microfluidic system.

Microfluidic systems have a microfluidic structure at least in sections in which one or several microchambers and/or microcanals are formed. For example, such microfluidic systems are provided as microfluidic testing elements or testing systems with which one or several analytes can be analyzed, for example, in a sample of a body fluid. For this purpose one or several reagents are provided in the microfluidic structure, in particular for a detection reaction with the analyte to be analyzed. The one or several reagents are arranged in the microcanals and/or the microchambers of the microfluidic structure in such a manner that they come in contact with the sample liquid during the application of the sample to be tested on the microfluidic testing element, whereupon a detection reaction usually takes place.

Document WO 93/04195 suggested producing spheres with a reagent for an analysis of a biological sample in that an aqueous solution of the reagent is prepared, drops of the aqueous solution are placed in a cold liquid for freezing and the frozen drops are lyophilized.

Lyophilizing involves a freeze-drying that results in a removal of liquid from the deep-frozen material in the vacuum. During this freezing of the solvent, which usually is water, the solvent evaporates in the frozen state (sublimation drying). In this manner a careful drying and preservation of one or several reagents is possible. The end product of a lyophilization is a frozen mass (lyophilizate) that can also be designated as a porous, stable and dry “lyo-cake”.

Document US 2007/0259348 A1 suggested producing lyophilized pellets that are suitable for being used in a microfluidic system. The lyophilized pellets can contain different biological reagents or microparticles. The pellets are produced in that drops of a reagent solution are placed on a cooled plate where they are frozen, after which a vacuum treatment takes place.

SUMMARY OF THE INVENTION

It is against the above background that the present invention provides certain unobvious advantages and advancements over the prior art. In particular, the inventors have recognized a need for improvements in methods for providing a dried reagent in a microfluidic system and microfluidic systems.

Although the present invention is not limited to specific advantages and functionality, it is noted that the present invention provides a method for providing dried reagents in a microfluidic system as well as to provide a microfluidic system in which at least one dried reagent can be introduced into the microfluidic system for remaining herein in a flexible manner that can be adapted to a particular usage.

In accordance with one embodiment of the present invention, a method for providing a dried reagent in a microfluidic system is provided, wherein the method comprises the following steps: providing a microfluidic system having a microfluidic structure, introducing a flowable carrier medium containing a reagent in the microfluidic structure, and drying the reagent in the microfluidic structure by lyophilization.

Furthermore, a microfluidic system is provided in provided in accordance with another embodiment of the invention, which a reagent dried by lyophilization is arranged in a microfluidic structure.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

DETAILED DESCRIPTION OF THE INVENTION

The present invention allows for at first introducing the reagent to be inserted in the microfluidic structure in dissolved or suspended form into the microfluidic structure in order to subsequently carry out a drying by lyophilization. In contrast to the pellets provided in the state of the art, the reagent can be introduced more readily into the sections of the microfluidic structure by means of the flowable carrier medium, for example, in the form of a solution or a suspension. It is not necessary to optimize the sections of the microfluidic structure in a geometrical aspect for the introduction of pellets or particles. Rather, the carrier medium which can be, for example, water, flows with the reagent into the sections of the microfluidic structure in the microfluidic system. In addition, a distribution of the reagent in the microfluidic structure or in sections of it that is as homogeneous as possible is facilitated by this in as far as such a homogeneous distribution is desired in the concrete application case. The microfluidic structure can be formed here in sections in the microfluidic system or can substantially entirely comprehend it.

Independently of the concrete distribution of the dried reagent in the microfluidic structure, the dried reagent rapidly and completely dissolves in a liquid, for example, in an aqueous solution that is introduced into the microfluidic structure during the use of the microfluidic system. This is especially advantageous, for example, in the case of kinetic measurements.

One or several reagents can be inserted into the microfluidic structure with the aid of the method. The insertion of several reagents can also take place, for example, by multiple use of the steps for the introduction of the carrier medium and subsequent lyophilization. Such a multiple use can, however, also be provided in connection with the introduction of only one reagent in the microfluidic structure.

A typical embodiment of the invention provides that the microfluidic structure is thermally treated before the introduction of the flowable carrier medium. In this manner the insertion of the reagent or reagents in the microfluidic structure can be purposefully influenced.

Another typical embodiment of the invention can provide that the microfluidic structure is thermally treated during the introduction of the flowable carrier medium.

In accordance with yet another typical embodiment of the invention, the microfluidic structure is cooled during the thermal treatment. The cooling of the microfluidic structure is a form of the thermal treatment in which, for example, the microfluidic structure or parts of it or the entire microfluidic system is/are cooled. The cooling can take place to the extent that the flowable carrier medium freezes immediately or close in time after the application during the contact with the surface of the microfluidic structure. In this manner a purposeful influencing of the distribution of the flowable carrier medium inside the microfluidic structure is made possible. The cooling is advantageous, for example if the flowable carrier medium contains a surfactant whose distribution in the microfluidic structure can be purposefully influenced in this manner.

Still another typical embodiment of the invention provides that the microfluidic structure is heated during the thermal treatment. The heating is a further form of the thermal treatment of the microfluidic system or of parts of it, especially of the microfluidic structure. This type of thermal treatment can also be used to control and regulate the spatial distribution of the reagent suspension or reagent solution inside the microfluidic structure. For example, a heating is advantageous if the flowable carrier medium contains surfactants whose distribution is otherwise difficult to control in microfluidic structures.

A purposeful embodiment of the invention can provide that the reagent is inserted in the microfluidic structure with an essentially homogeneous distribution.

An embodiment of the invention provides that the flowable carrier medium contains one or several surfactants and/or one or several filling materials. These form a type of chemical grid for the reagent(s) in the microfluidic structure after the drying, as a result of which, for example, a homogeneous and rapid dissolving of the reagents is supported.

It can be provided in an advantageous embodiment of the invention that a microfluidic system selected from the following group of systems is provided: microfluidic testing element and microfluidic chip. In one embodiment testing elements like those described in U.S. Pat. Appln. Pub. No. 2009/0191643 A1 are typically used, the disclosure of which is hereby incorporated by reference. Analysis systems are used there that are charged with dry reagents and are essentially disk-shaped.

In order to provide a microfluidic system that is provided at least in sections with the microfluidic structure in the form of micro-channels and/or microchambers, at first a reagent solution or reagent suspension is prepared in which one or several reagents are present in dissolved or suspended form. Then, the microfluidic system is provided, for example, in the form of a microfluidic testing element or of a microfluidic chip. Subsequently, the reagent solution or reagent suspension is applied, for example, approximately 10 microliters are charged. This takes place for its part under atmospheric pressure. The applied liquid penetrates at least partially into the microfluidic structure of the microfluidic system. The microfluidic system can be pre-cooled, for example, by placing it on a cooled support surface that was pre-cooled for its part, for example, to approximately −50° C.

A freezing at approximately −70° C. and atmospheric pressure follows, for example, for a period of three to four hours. During a following drying in the vacuum for several hours, for example, approximately 14 hours, the ambient temperature is raised, typically in steps of approximately 0.1° C./minute, until a temperature of approximately 25° C. is attained that is then maintained constant. This method step is carried out at an ambient pressure of approximately 0.4 mbar. The described method can be carried out, for example, with a cholesterol reagent containing a surface-active substance.

It is possible with the aid of the described method to provide one or several reagents in dried form inside the microfluidic structure of the microfluidic system with a desired distribution, for example, with an essentially homogeneous distribution. The application of the reagent solution or reagent suspension makes possible a ready penetration of the reagent or reagents into the microstructure. The drying is subsequently carried out by lyophilization.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for providing a dried reagent in a microfluidic system, wherein the dried reagent is provided for a detection reaction with an analyte to be analyzed, the method comprising:

providing a microfluidic system having a microfluidic structure, cooling the microfluidic structure, introducing a flowable carrier medium containing a reagent and at least one surfactant into the microfluidic structure, wherein the microfluidic structure is cooled before the flowable carrier medium is introduced therein such that the flowable carrier medium freezes upon introduction into and contact with the microfluidic structure, and drying the reagent in the flowable carrier medium in the microfluidic structure by lyophilization to provide the dried reagent for the detection reaction, wherein the reagent is dried by the lyophilization after the flowable carrier medium is frozen upon introduction into and contact with the microfluidic structure.

2. The method according to claim 1, wherein the microfluidic structure is cooled during the introduction of the flowable carrier medium.

3. The method according to claim 1, wherein the reagent is introduced into the microfluidic structure with an essentially homogeneous distribution.

4. The method according to claim 1, wherein the microfluidic system is a microfluidic testing element or a microfluidic chip.

5. A microfluidic system comprising a micofluidic structure, said microfluidic structure comprising a dried reagent provided by the method of claim 1.

6. The method according to claim 1, wherein the microfluidic structure is cooled before the flowable carrier medium is introduced therein by placing the microfluidic structure on a cooled support surface having a surface temperature of about −50° C.

7. The method according to claim 1, wherein the at least one surfactant forms a chemical grid for the reagent in the microfluidic structure after the drying.

8. A method for providing a dried reagent in a microfluidic system, wherein the dried reagent is provided for a detection reaction with an analyte to be analyzed, the method comprising:

providing a microfluidic system having a microfluidic structure, cooling the microfluidic structure, introducing a flowable carrier medium containing a reagent and at least one surfactant or at least one filling agent into the microfluidic structure, wherein the microfluidic structure is cooled before the flowable carrier medium is introduced therein such that the flowable carrier medium freezes upon introduction into and contact with the microfluidic structure, and drying the reagent in the flowable carrier medium in the microfluidic structure by lyophilization to provide the dried reagent for the detection reaction, wherein the reagent and the at least one surfactant or the at least one filling agent are introduced into the microfluidic structure before the lyophilization.

9. The method of claim 1, wherein the cooled microfluidic structure purposefully influences the introduction of the flowable carrier medium therein.

10. A method for providing a dried reagent in a microfluidic system, wherein the dried reagent is provided for a detection reaction with an analyte to be analyzed, the method comprising:

providing a microfluidic system having a microfluidic structure, pre-cooling the microfluidic structure by placing the microfluidic structure on a cooled support surface having a surface temperature of about −50° C., introducing a flowable carrier medium containing a reagent and at least one surfactant into the microfluidic structure, wherein the microfluidic structure is pre-cooled before the flowable carrier medium is introduced therein such that the flowable carrier medium freezes upon introduction into and contact with the microfluidic structure and such that the introduction of the flowable carrier medium into the microfluidic structure is purposefully influenced, and freeze-drying the reagent in the flowable carrier medium in the microfluidic structure to provide the dried reagent for the detection reaction, the reagent being freeze-dried after the flowable carrier medium freezes upon introduction into and contact with the microfluidic structure, wherein the freeze-drying comprises:

freezing the reagent in the flowable carrier medium at about −70° C., and drying the reagent in the flowable carrier medium in a vacuum after the reagent is frozen at about −70° C., wherein the ambient pressure is about 0.4 mbar and the ambient temperature is raised at a rate of about 0.1° C/minute to an ambient temperature of about 25° C.

11. The method of claim 10, wherein:

the reagent is frozen in the flowable carrier medium at about −70° C. for a period of 3 to 4 hours, and the reagent is dried in the vacuum for about 14 hours.

* * * * *

UNITED STATES PATENT AND TRADEMARK OFFICE

CERTIFICATE OF CORRECTION

PATENT NO. : 8,790,932 B2
APPLICATION NO. : 12/573472
DATED : July 29, 2014
INVENTOR(S) : Manfred Augstern et al.

It is certified that error appears in the above-identified patent and that said Letters Patent is hereby corrected as shown below:

In the Specification

Col. 2, Line 1-2, ““‘system is provided in provided in” should read --system is provided in--.

Signed and Sealed this
Twelfth Day of May, 2015

Michelle K. Lee
*Director of the United States Patent and Trademark Office*